(12) United States Patent
Thomas et al.

(10) Patent No.: US 8,109,054 B2
(45) Date of Patent: Feb. 7, 2012

(54) CONSTRUCTION FASTENER

(76) Inventors: Devin K. Thomas, Paradise, UT (US);
Tricia A. Thomas, Paradise, UT (US);
Ryan D. Ohlwiler, Paradise, UT (US)

( * ) Notice: Subject to any disclaimer, the term of this patent is extended or adjusted under 35 U.S.C. 154(b) by 0 days.

(21) Appl. No.: 12/156,220

(22) Filed: May 29, 2008

(65) Prior Publication Data

US 2008/0307742 A1    Dec. 18, 2008

Related U.S. Application Data

(60) Provisional application No. 60/932,215, filed on May 29, 2007.

(51) Int. Cl.
*E04C 2/52* (2006.01)

(52) U.S. Cl. ......... 52/220.2; 52/698; 52/220.1; 220/3.5; 220/3.3; 248/906

(58) Field of Classification Search ................. 52/220.2, 52/220.1, 698, 699, 700, 127.2; 174/50, 174/58, 63; 220/3.2, 3.5, 3.3; 248/906
See application file for complete search history.

(56) References Cited

U.S. PATENT DOCUMENTS

| | | | | |
|---|---|---|---|---|
| 1,568,155 A | * | 1/1926 | Heath | 52/206 |
| 1,779,681 A | * | 10/1930 | Smith et al. | 220/3.6 |
| 1,785,790 A | * | 12/1930 | Ropp | 52/702 |
| 1,811,687 A | * | 6/1931 | Philip et al. | 174/57 |
| 2,272,846 A | * | 2/1942 | Lindstrom | 220/3.6 |
| 2,448,001 A | * | 8/1948 | Maurette | 248/343 |
| 2,512,188 A | * | 6/1950 | Wait et al. | 248/27.1 |
| 2,514,176 A | * | 7/1950 | Borkowski | 248/27.1 |
| 2,605,668 A | * | 8/1952 | Hollopeter | 411/342 |
| 2,633,263 A | * | 3/1953 | Stonaker | 220/3.4 |
| 2,952,099 A | * | 9/1960 | Futterer | 52/698 |
| 3,180,595 A | * | 4/1965 | Birkhold et al. | 248/27.3 |
| 3,200,544 A | * | 8/1965 | Greek | 52/27 |
| 3,518,331 A | * | 6/1970 | Marin | 264/35 |
| 3,674,913 A | * | 7/1972 | Yates | 174/503 |
| 3,908,321 A | * | 9/1975 | Cox et al. | 52/79.14 |
| 3,999,347 A | * | 12/1976 | Devlin | 52/514 |
| 4,296,870 A | * | 10/1981 | Balkwill et al. | 220/3.3 |
| 4,390,105 A | * | 6/1983 | Graves | 220/3.6 |
| 4,518,141 A | * | 5/1985 | Parkin | 248/546 |
| 4,538,786 A | * | 9/1985 | Manning | 248/544 |
| 4,635,372 A | * | 1/1987 | Tande | 33/613 |
| 4,659,051 A | * | 4/1987 | Propp et al. | 248/546 |
| 4,729,540 A | * | 3/1988 | Rozema | 249/1 |
| 4,924,646 A | * | 5/1990 | Marquardt | 52/220.1 |
| 4,988,067 A | * | 1/1991 | Propp et al. | 248/343 |
| 5,033,949 A | * | 7/1991 | Jewett | 425/12 |
| 5,085,393 A | * | 2/1992 | Ryan | 248/343 |
| 5,114,105 A | * | 5/1992 | Young | 248/27.1 |
| 5,239,132 A | * | 8/1993 | Bartow | 174/58 |

(Continued)

*Primary Examiner* — Robert Canfield
*Assistant Examiner* — Babajide Demuren
(74) *Attorney, Agent, or Firm* — Peck, Hadfield, Baxter & Moore; Keely Schneiter

(57) ABSTRACT

Embodiments of the present invention include a construction fastener configured to secure a utility box in a specified position within a wall. The construction fastener includes a front portion, a center portion, and an end portion. The end portion and center portion of the fastener are inserted through the utility box, with part of the end portion extending beyond the back surface of the utility box. The front portion thus rests across a front surface of the utility box. The end portion is secured against the back surface of the utility box and the position of the utility box within the wall is maintained.

12 Claims, 2 Drawing Sheets

U.S. PATENT DOCUMENTS

| | | | |
|---|---|---|---|
| 5,242,269 A * | 9/1993 | Chang | 416/244 R |
| 5,243,802 A * | 9/1993 | Zetena, Jr. | 52/514 |
| 5,359,152 A * | 10/1994 | Hone-Lin | 174/53 |
| 5,491,901 A * | 2/1996 | Parrino | 33/528 |
| 5,522,577 A * | 6/1996 | Roesch | 248/343 |
| 5,778,625 A * | 7/1998 | Druffel et al. | 52/577 |
| 6,038,829 A * | 3/2000 | Franks | 52/645 |
| 6,101,731 A * | 8/2000 | Mesa | 33/528 |
| 6,547,589 B2 * | 4/2003 | Magyar et al. | 439/535 |
| D490,559 S * | 5/2004 | Small | D26/138 |
| 6,953,894 B2 * | 10/2005 | Ungerman et al. | 174/58 |
| 7,124,550 B1 * | 10/2006 | Deming | 52/745.21 |
| 2002/0035814 A1 * | 3/2002 | Sarver | 52/699 |
| 2004/0188126 A1 * | 9/2004 | Grendahl | 174/66 |
| 2006/0163247 A1 * | 7/2006 | Bryant | 220/3.2 |

* cited by examiner

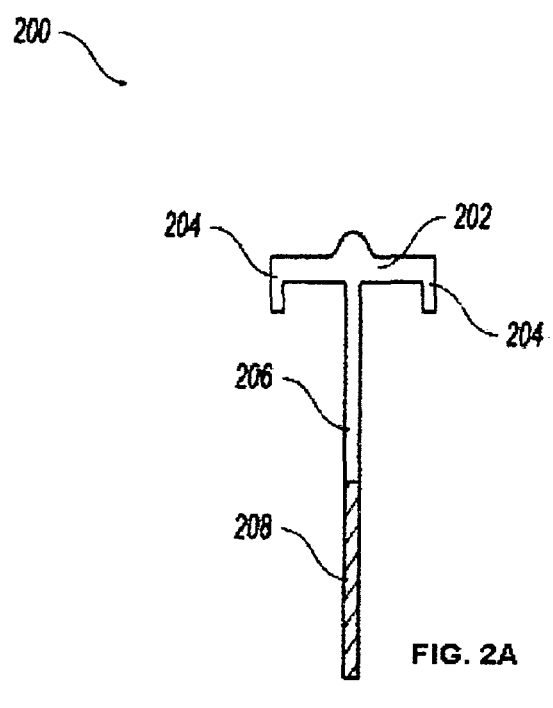
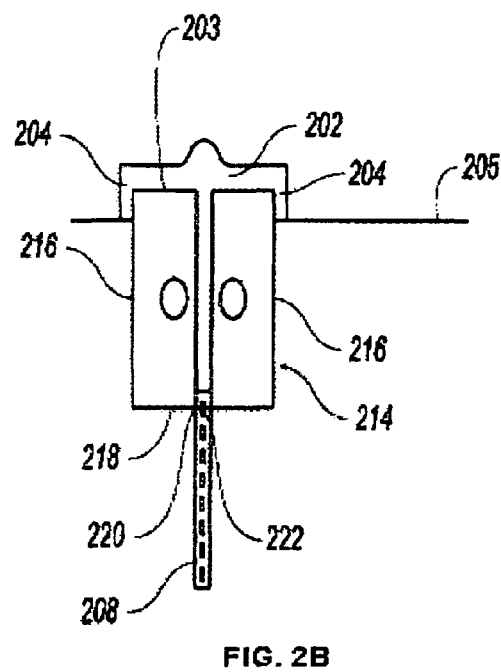
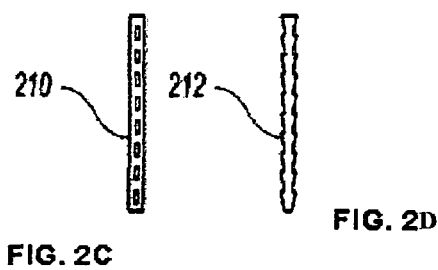
FIG. 2A
FIG. 2B
FIG. 2C
FIG. 2D

CONSTRUCTION FASTENER

CROSS-REFERENCE TO RELATED APPLICATIONS

This application claims priority to U.S. Provisional Patent Application No. 60/932,215, filed May 29, 2007, which is hereby incorporated by reference in its entirety.

BACKGROUND OF THE INVENTION

1. The Field of the Invention

This invention relates generally building materials. More specifically, embodiments of the present invention relate to placement, arrangement, and configuration of utility boxes within building materials.

2. Related Technology

Construction of a residential, commercial, or other structure is a culmination of engineering and architectural design and represents the final step in an often lengthy planning process. Construction of a building may be a time and labor intensive project that generates not only extensive costs but also substantial profits for many of those involved in the process.

In order to increase profits and decrease expenses, those involved with construction may seek products that improve efficiency in their projects. Products that can help streamline the construction process, reduce required manpower, increase individual work quality and/or increase the quality of the completed task are particularly valuable.

Although builders seek to streamline processes, construction projects require a variety of materials to insure quality of construction and that buildings meet required legal codes. Utility boxes are one such material used in construction in areas of wiring systems where wires and/or conduits connect. The utility box can provide protection from fire and other forms of damage, as well as prevent tampering and help to make a wiring system more organized or aesthetically pleasing. Some utility boxes may connect to lights or other external electrical features.

While many products have been developed to improve quality and efficiency in building construction, certain projects still require more time and energy than is desirable. For example, in residential and commercial construction utility boxes, often attached to conduits for electrical and other wiring, are inserted into a wall during construction and must be maintained in a specific position. Maintaining the position of the utility box is most often achieved by improvising with construction materials on hand. For example, workers will attempt to secure the position of the utility box by propping the box up with construction material scraps found on site. Such securing methods are not only relatively unstable and unreliable, they can also be time consuming to configure.

What is needed is a reliable and secure way to hold utility boxes in place while construction of a wall, or other part of a building, is completed.

BRIEF SUMMARY OF THE INVENTION

Embodiments of the present invention include fasteners for securing utility boxes in walls during construction. A fastener substantially surrounds a front portion of a utility box, with a center portion of the fastener extending through the utility box. The fastener further includes an end portion that extends beyond a back portion of the utility box and is secured. The fastener thus holds the utility box in a desired position while construction of the wall or other structure is completed. The fastener may then be easily removed, if desired.

These and other aspects of the present invention will become more fully apparent from the following description and appended claims, or may be learned by the practice of the invention as set forth hereinafter.

BRIEF DESCRIPTION OF THE DRAWINGS

To further clarify the above and other aspects of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The drawings are not drawn to scale. The invention will be described and explained with additional specificity and detail through the use of the accompanying drawings in which:

FIG. 2A shows embodiments of a fastener; and

FIG. 2B shows a fastener configured with a utility box.

FIG. 2C shows one embodiment of an end portion of a fastener.

FIG. 2D shows one embodiment of an end portion of a fastener.

DETAILED DESCRIPTION OF EXEMPLARY EMBODIMENTS

Figure 1:
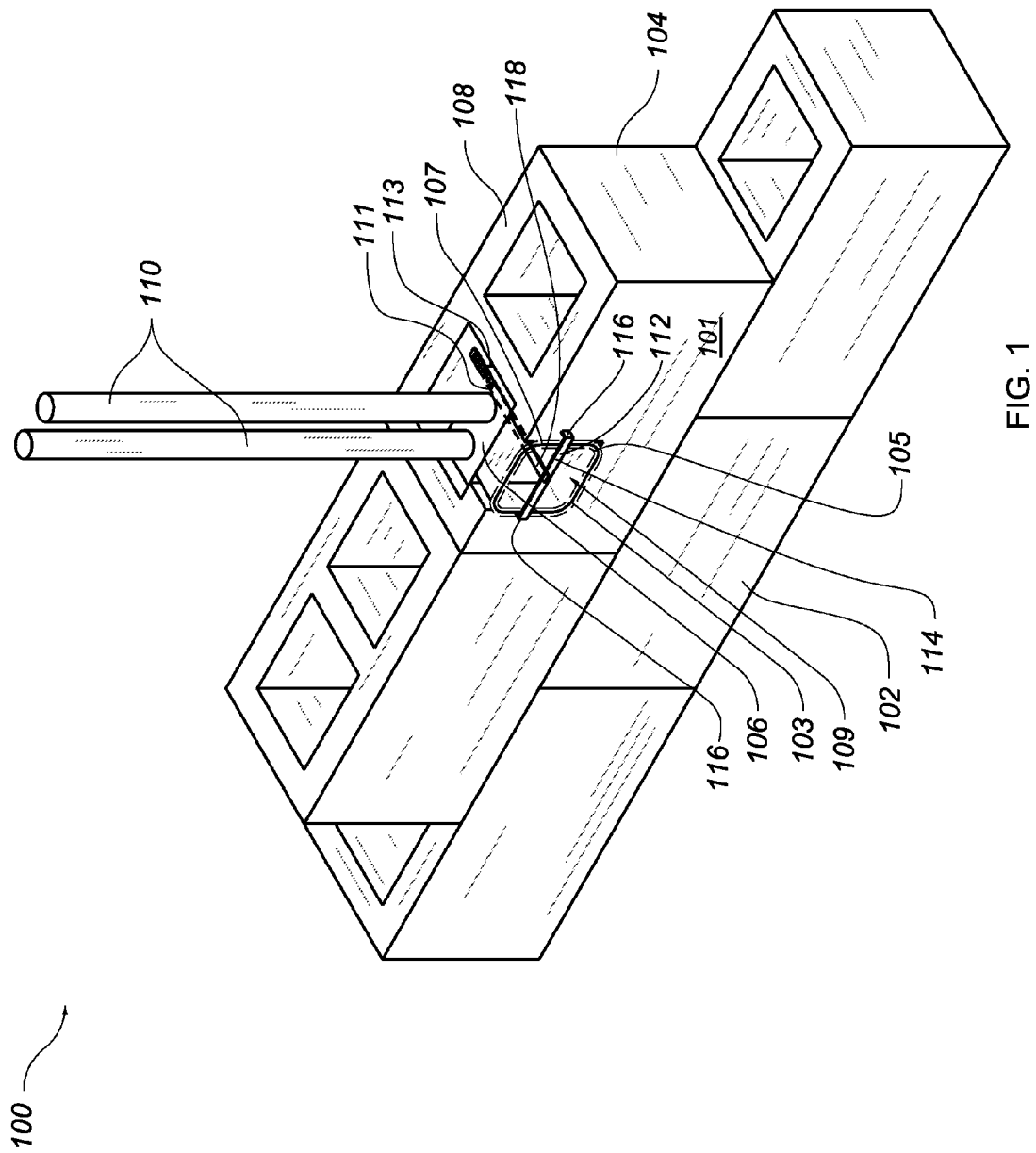
FIG. 1 shows a fastener used with a utility box in construction of a wall.

Embodiments of the present invention include a holding device for maintaining a utility box in a specific position during construction of a wall. A holding device secures a utility box to a face of building materials, such as a concrete masonry unit, while additional building materials are added to a structure, such as a wall. Thus, a utility box may be maintained in an exact position while a portion of a building is constructed.

With attention now to FIG. 1, a wall system 100 is shown. Wall system 100 includes a wall 102 of a building, such as a residence or commercial building. In one embodiment of the invention, as shown in FIG. 1, the wall 102 may be constructed of bricks, blocks, or other units that may be combined to form a wall. Brick 104, having a face 101, is an example of such a building unit. Although FIG. 1 shows an embodiment of the present invention where bricks are used to construct wall 102, it is to be appreciated that any building materials, such as, for example, concrete masonry units, or other building materials, may be used in embodiments of the present invention.

In addition to being construction of bricks, such as brick 104, wall 102 further includes utility box 106, and an associated mud ring or plaster ring 107, positioned within brick 108. Utility box 106 is enclosed on all sides except a face 109, allowing electrical and other utility wiring to be accessible through the face 109 of utility box 106. While face 109 is essentially open space, it may also helpful to think of face 109 as an invisible planar surface defined by either the front edge 103 of utility box 106, or a front edge 105 of mud ring 107. In one embodiment of the invention, the front edge 103 and front edge 105, and the planar surface or surfaces defined by theses edges, are referred to as the front of the utility box. Moreover, the top of utility box 106 is configured with two conduits. Electrical wiring, including electrical wiring that is accessible through the face of utility box 106, may be configured to run through conduits 110.

While utility box 106 is enclosed on all sides except face 109, utility box 106 further includes an opening 111 configured to engage a fastener 112. Opening 111 is located in a back side 113 of utility box 106. As noted, fastener 112 is inserted through face 109 of utility box 106. Fastener 112 includes front portion 114, side portions 116, and center portion 118, which extends orthogonally from front portion 114 of fastener 112. End portion 120 extends from center portion 118.

When walls, such as wall 102, of buildings are constructed, utility boxes such as utility box 106 are inserted into the wall to allow for electrical wiring to be routed to outlets and other power sources that will be housed in utility boxes 106. As noted above, this electrical wiring may be routed through conduits 110. The utility box 106 must be placed in a position such that the front or face 109 of the utility box extends out from a face 101 of the brick 104. The utility box 106 is placed in this position in order to allow for finishing materials, such as dry wall (not shown), to be added to the wall system 100 without causing the utility box 106 to be recessed into the finished wall. Thus, it is necessary to precisely place the utility box 106 in a position to ensure that when finishing materials are added to wall system 100, the face 109 of utility box 106 will be flush with the finished wall.

In order to easily maintain utility box 106 in a position to allow for finishing materials to be added to wall system 100 without recessing the face 109 of utility box 106 behind the surface of the finished wall, fastener 112 is employed to hold utility box 106 in place. Fastener 112 is inserted through face 109 of utility box 106 as end portion 120 is placed through opening 111. Face 109 of utility box 106 (or either of edges 103 or 105 of utility box 106 and mud ring 107, respectively) contacts the front portion 114 of fastener 112. In one embodiment of the invention, end portion 120 is configured to securely engage opening 111 such that when fastener 112 has been inserted into utility box 106 so that side portions 116 of fastener 112 contacts the front 101 of wall 104 and face 109 of utility box 106 contacts front portion 114, fastener 112 is held securely in place. While FIG. 1 shows one embodiment of side portions 116 of fastener 112, it is to be appreciated that any shape or configuration of material that would maintain the front portion 114 a certain distance from the front 101 of wall 104 is encompassed in embodiments of the present invention. In addition, side portions 116 may be characterized as a means for maintaining the front portion 114 of fastener 112 a specified distance from front 101 of wall 104.

For example, end portion 120 is configured in a manner such that once end portion 120 has been pushed through opening 111, end portion 120 cannot be pulled out of opening 111. In one embodiment of the invention this is achieved by a jagged edge design of end portion 120. The jagged edges are configured with a narrower leading edge and a wider trailing edge, with the leading edge pointing in the direction in which the end portion 120 is inserted through opening 111. The material with which fastener 112 is made is able to deform somewhat such that jagged edges of end portion 120 can be pushed through opening 111. However, the shape of the jagged edges prevents fastener 112 from being pulled out of opening 111.

In one embodiment of the invention, side portion 116 are configured to have a length equal to the width of any finishing materials, such as, for example, dry wall, that will cover wall 102. Thus, after wall 102 has been completed and finishing materials are added to the wall 102, the front of the utility box 106 will be flush with the surface of the finished wall. Further discussion of how end portion 112 securely engages opening 111 of utility box 106 is included below with reference to FIG. 2B.

Although embodiments of the invention as described above with regard to FIG. 1 include a fastener 112 for securing a utility box 106 during construction, other embodiments of the present invention include use of a fastener 112 for securing any number of construction materials or structures that may need to be held in a specific position while a building is under construction.

With reference now to FIG. 2A, embodiments of a fastener 200 are shown. Fastener 112, as discussed above with reference to FIG. 1, is an example of one embodiment of fastener 200 shown in FIG. 2A. Fastener 200 may be configured of any material, such as, for example, steel, spring steel, aluminum, plastic, or any other material. Fastener 200 includes front portion 202 having side portions 204. Center portion 206 extends orthogonally from the center of front piece 202 and includes end portion 208. End portion 208 may be configured in any way that will enable end portion 208 to be securely fastened to a back portion of a utility box, such as utility box 106 as shown in FIG. 1. For example, in one embodiment of the invention shown in FIG. 2C, end portion 210 is configured as a holed portion 210, with multiple holes through which a pin, zip tie, or any other object may be inserted and secured, thus holding fastener 200 in place. In another embodiment of the invention as shown in FIG. 2D, the end portion is configured as shown by jagged portion 212, which once inserted through a back portion of a utility box secures the end portion through the utility box by preventing jagged portion 212 from being pulled out.

Although holed portion 210 and jagged portion 212 are shown in FIGS. 2C and 2D, repectively, as embodiments of end portion 208, it is to be appreciated that any embodiment of end portion 208 which will secure part of end portion 208 through a utility box is anticipated by embodiments of the present invention. Such embodiments may include, but are not limited to, tying portions, adhesive portions, bending portions, and any other means for securing end portion 208 through a utility box.

Moreover, although side portions 204 are shown in a configuration orthogonal to front portion 202 of fastener 200, it is to be appreciated that embodiments of the present invention include any means for positioning front portion 202 a set distance from a wall. For example, side portions 204 may be bent portions, curved portions, or end of front portion 202 that are thicker in width than front portion 202, thus separating front portion 202 a set distance from a brick or wall. Further, side portions 204 may be hinged portions, pivoting ends, or any other attached or detachable end portions that function to separate front portion 202 a certain distance from the face of a brick, wall, or other surface.

With attention now to FIG. 2B, FIG. 2b shows an embodiment of fastener 200 configured with a utility box 214. Front portion 202 of fastener 200 engages a front 203 of utility box 214, with side portions 204 extending onto sides 216 of utility box 214. Side portion 204 further contact wall 205. Center portion 206 extends through utility box 214 such that end portion 208 extends beyond back portion 218 of utility box 214. More particularly, in some embodiments of the invention end portion 208 extends through an openings 220 located in back portion 218 of utility box 214.

In operation, utility box 214 is positioned in a wall 205 in a desired location. In order to secure utility box 214 in the desired location, fastener 200 is positioned such that center portion 206 extends through the interior of utility box 214, with end portion 208 extending through opening 220. In one embodiment of the invention where end portion 208 is a holed portion, as shown in FIG. 2B, a fastening piece, such as, for example, a pin or zip-tie, is inserted through end portion opening 222 to secure fastener 200 to utility box 214. Front 203 of utility box 214 is secured against front portion 202 of the fastener as front portion 202 of fastener 200 is pulled against the surface of wall 205, while the back portion 218 of utility box 214 is pushed against the pin or zip tie that has been entered into opening 220 of end portion 208, thus securing the utility box 214 in a fixed position relative to wall 205.

In addition, side portions 204 also function to ensure correct positioning of utility box 214 within a wall. Side portions 204 may be of any length, depending on the desired position of utility box 214. In one embodiment of the invention, utility box 214 is positioned within a wall so that an additional wall surface, such as, for example, sheet rock may be added to the wall at a later time. In this embodiment side portions 204 displace the front portion of the utility box 214 a specified distance, such as, for example, ¼ inch or ⅛ inch, from the front surface of the wall. In other embodiments of the invention side portions 204 do not displace a front portion of the utility box 214 from the front surface of the wall.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A construction fastener, comprising:
   a front portion having a first end and a second end, wherein the first and second ends hold the front portion in a position a certain distance from a face of a brick;
   a center portion extending from the front portion, the center portion being inserted through a utility box and extending substantially the entire width of the utility box from the front edge to the back side of the utility box; and,
   an end portion attached to the center portion, the end portion extending through the back side of the utility box where the end portion is secured thus the fastener holding the utility box in a position such that the front of the utility box extends out from the face of the brick to the front portion of the fastener.

2. The construction fastener as recited in claim 1, wherein the construction fastener is removable.

3. The construction fastener as recited in claim 1, wherein the construction fastener is configured of one or more of: plastic; steel; spring steel; and, aluminum.

4. The construction fastener as recited in claim 1, wherein the center portion extends orthogonally from the front portion.

5. The construction fastener as recited in claim 1, wherein the end portion includes multiple holes through which an object is inserted to secure the end portion.

6. The construction fastener as recited in claim 1, wherein the end portion is jagged such that the jagged end portion may not be removed from a hole in the utility box by pulling on the front portion of the construction fastener.

7. The construction fastener as recited in claim 1, wherein the fastener is further configured to attach to the utility box through a mud ring.

8. The construction fastener as recited in claim 1, further comprising means for maintaining the front portion a set distance from a surface.

9. A device for holding a utility box in a position a set distance out from a wall surface, comprising:
   a front portion having at least two ends, wherein the at last two ends rest against the wall surface and hold the front portion a set distance out from the wall surface;
   a center portion attached to the front portion that extends through the utility box from a front surface to a back side of the utility box; and,
   an end portion configured to extend through an opening in the back side of the utility box, the end portion further configured to be secured through the opening, thus holding the device securely against the wall surface.

10. The device as recited in claim 9, wherein the device is comprised of one or more of: steel; spring steel; and, aluminum.

11. The device as recited in claim 9, wherein the device is removable.

12. The device as recited in claim 9, wherein the end portion is one or more of: jagged; and, holed.

* * * * *